Figure 1:
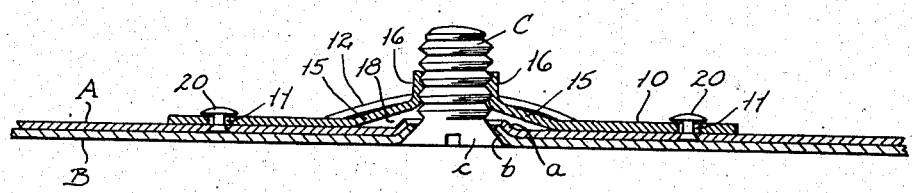

June 26, 1945.   G. A. TINNERMAN   2,378,957
FASTENING DEVICE
Filed Dec. 22, 1943

Inventor
George A. Tinnerman.
By Bates, Teare & McBean,
Attorneys.

Patented June 26, 1945

2,378,957

UNITED STATES PATENT OFFICE 2,378,957

FASTENING DEVICE

George A. Tinnerman, Cleveland, Ohio, assignor to Tinnerman Products, Inc., Cleveland, Ohio, a corporation of Ohio Original application June 29, 1942, Serial No. 448,943. Divided and this application December 22, 1943, Serial No. 515,241

4 Claims. (Cl. 85—32)

This application is a division of my pending application, Serial No. 448,943, filed June 29, 1942.

This invention relates to a fastening device provided by a plate having two integral upturned arcuate lugs inwardly grooved so that the two lugs provide a helical thread to engage the thread of a bolt for a plurality of turns.

One of the objects of my invention is to carry the arcuate threaded lugs in a resilient manner so that they may be swung inwardly and pulled down by the applied bolt to act not only as a nut therefor, but as a spring lock applying continuous tension to the bolt and thus forming their own nut lock. The lugs are thus self-energizing and retain their resilient action indefinitely, so that the bolt may be removed whenever desired and a bolt supplied subsequently with the same locking action.

Another object of the invention is to provide such fastening device in a form having a flat base adapted for permanent attachment to a plate or support, the tongues inclining from such base and resiliently carrying the threaded lugs.

Another object is to so form the tongues that there will be no danger of their flexing adjacent to the lugs, with the danger of a permanent set when the device has been applied, but, on the contrary, insuring the flexing from a region considerably distant from the lugs and thus maintaining the resiliency.

Another object of the invention is to so devise the various parts of the fastener that the lugs may be readily drawn from the tongue portions of the blank and sufficient metal will be available for the formation of properly grooved lugs without requiring undue thickness of the plate.

In carrying out my invention, I provide a flat plate adapted for permanent mounting on a support, and I form in the plate a pair of parallel slits with a transverse opening between them, and I bend the two tongues left between these slits upwardly at oblique angles to the base and I bend arcuate lugs upwardly from the end portions of the tongues at oblique angles to the tongues. These arcuate lugs are inwardly threaded and thus form a nut while the spring tongues carrying them serve to self-energize them to cause them to maintain a constant tension on the bolt. The result is that after the plate is applied to its support the self-energizing nut is always available to receive the bolt and lock it and at the same time allows removal of the bolt whenever desired and then is ready for the application of a subsequent bolt.

In effecting the resilient support of the arcuate lugs I arch the tongues or curve them transversely, with the result that the flexing of the tongues as the lugs are drawn inwardly takes place at the root of the tongues, that is, at the junction with their flat base. By this means, a comparatively long arm is provided supporting the arcuate lug and insuring resiliency. There is no danger of a permanent set at the first application, which might take place if the tongue flexed adjacent the lug. The arching of the tongues also has the advantage that the arcuate lugs are more readily drawn from the adjacent metal.

A particular object of the invention of this divisional application is to provide a fastener which will readily receive a countersink or inwardly projecting portion of the plate to which it is secured, so that by employing a bolt with a countersunk head, I may automatically flange an attached plate inwardly in a frusto-conical form to receive the head of the bolt, leaving the face of the head flush with that of the applied plate, while the threaded shank is firmly grasped by the arcuate lugs. This is also a feature of my invention and is illustrated in some of the views of the accompanying drawing.

Figure 2:
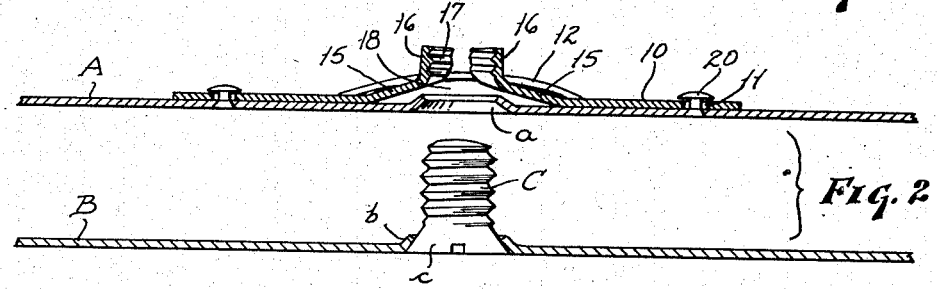
Figure 4:
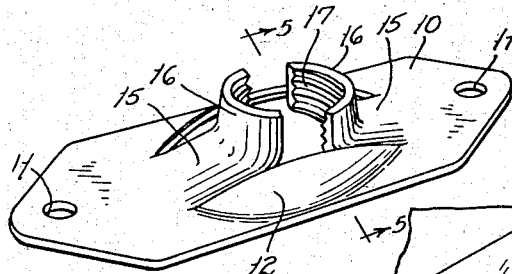
Figure 3:
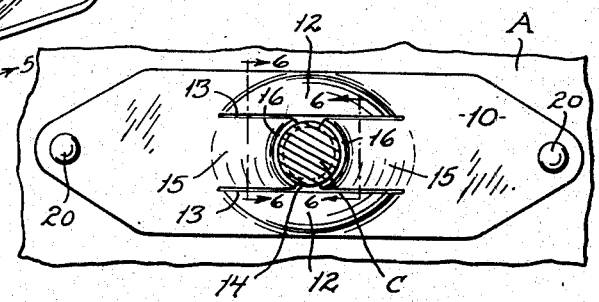
Figure 6:
Figure 5:
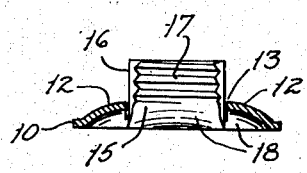

In the drawing, Fig. 1 is a section through my fastener, the fastener being shown as riveted to a supporting plate receiving the bolt through an applied plate; Fig. 2 is a separated view of the partition of Fig. 1 before the bolt has passed into the fastener; Fig. 3 is a plan of the fastener sectioned through the bolt beyond the fastener; Fig. 4 is a perspective of the fastener; Fig. 5 is a cross section of the fastener, as indicated by the line 5—5 on Fig. 4; Fig. 6 is a cross section of either one of the tongues of the fastener, as indicated by the lines 6—6 on Fig. 3.

As shown in Figs. 1 and 2, A indicates a suitable supporting plate and B a plate adapted to be attached thereto. My fastener comprises a flat elongated plate 10, shown as having openings 11 through it for the reception of the rivets 20 by which the plate is secured to the supporting plate A.

In the intermediate region of the plate 10 between its side zones 12, I cut a pair of parallel slits 13, and between these slits I form a central opening 14 extending transversely from one slit to the other. This leaves a pair of opposed tongues 15 between the slits. The ends of these tongues are bent up in the form of arcuate lugs 16 which extend slightly toward each other and are internally threaded by inclined ribs and grooves on each lug forming in effect a continuous helix 17, part one one lug and part on the other.

The tongues are arched upwardly transversely as indicated in Figs. 4 and 6, from the root of the lug nearly to the root of the tongue, such arch being flattened as the tongue merges with the base. It results from this that the two arcuate lugs which provide a helical thread to receive the bolt, are resiliently carried.

The transverse arching of the tongues restricts the flexing of the tongue to a region at its junction with the plate 10. This gives a long arm carrying the threaded lug, insuring resiliency in the action. There is no chance for the tongue to be bent in some intermediate region, which might result in a permanent set of the metal on the first application of the fastener.

My fastener is especially adapted for use with bolts having countersunk heads. To enable this the side zones 12 of the base plate are formed into dome segments, as shown. These dome segments and the intermediate inclined tongues, when proportioned as shown, make in effect an elliptical dome rising from the flat body of the plate 10. In any case the two dome segments and the upwardly inclined tongues leave a vacant space 18 above the bottom plane of the plate 10 and above the supporting plate A to which it is shown as secured by rivets 20.

The supporting plate A is shown as having an opening surrounded by a frusto-conical flange a extending into the opening beneath the dome. This provides for countersinking the applied plate B, about to be described.

The applied plate B has an opening for the reception of the bolt, which opening is surrounded by a frusto-conical flange b. The screw C having a conical head c is adapted to pass through the openings of the plates B and A into the bolt opening 14 (Fig. 3) of the fastener and engage the thread 17 provided by the lugs 16 of the fastener. In such position, when the bolt has been turned home, the frusto-conical flange at the plate A occupies the space 18 beneath the dome segments and beneath the tongues 15, and the frusto-conical flange b of the applied plate B nests within the flange a and the conical head c of the screw C snugly engages the conical flange b.

The construction just described enables the outer surface of the screw head to be flush with the surface of the plate B. This is particularly advantageous in airplane or other work where it is desired to streamline the surfaces as much as possible and prevent any external obstructions. The doming of the fastener provides for this countersinking of the supporting and applied plates and fastening bolt in a very simple and efficient manner. At the same time this doming stretches metal from the body of the fastener plate into the dome and thus draws metal to the root of the tongues, forcing them toward the center and making more metal available for the formation of the upturned arcuate lugs which carry the screw thread.

I claim:

1. A fastening device comprising a plate, a pair of dome segments formed from the body of the plate, a pair of opposed tongues cut from the intermediate region of the plate and bent up obliquely and transversely arched, and arcuate lugs upturned from the ends of the tongues and helically threaded on their adjacent faces.

2. A fastening device comprising a plate of sheet material, a pair of dome segments pressed upwardly from the body of the plate, a pair of opposed tongues between the inner edges of the segments, said tongues being joined to the body of the plate at their distant ends and being transversely arched in an upward direction and arcuate lugs upturned from the ends of the tongues with their convex faces outwardly, said lugs being helically threaded on their concave faces.

3. A fastening device comprising an elongated plate, a substantially elliptical dome formed from the body of the plate by dome segments and a pair of opposed tongues cut from the body by a pair of slits parallel with the major axis of the ellipse and formed at their ends to engage a bolt passing through the plate, there being a free space beneath such dome.

4. A fastening device comprising a plate having a bolt opening, a pair of dome segments formed from the body of the plate and lying respectively on opposite sides of said opening, opposed tongues partially severed from the body of the plate between the dome segments and attached to the plate at their distant ends and arcuate lugs upturned from the adjacent ends of the tongues and threaded for a plurality of turns on their adjacent faces by ribs and grooves forming in effect one continuous helix.

GEORGE A. TINNERMAN.